(12) United States Patent
Cochran

(10) Patent No.: US 6,735,637 B2
(45) Date of Patent: May 11, 2004

(54) METHOD AND SYSTEM FOR PROVIDING ADVANCED WARNING TO A DATA STAGE DEVICE IN ORDER TO DECREASE THE TIME FOR A MIRROR SPLIT OPERATION WITHOUT STARVING HOST I/O REQUEST PROCESSSING

(75) Inventor: Robert A. Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 09/895,476

(22) Filed: Jun. 28, 2001

(65) Prior Publication Data

US 2003/0056038 A1 Mar. 20, 2003

(51) Int. Cl.$^7$ ................................................ G06F 3/00
(52) U.S. Cl. ............................... 710/5; 710/19; 710/52; 712/225; 711/112
(58) Field of Search ............................ 710/1, 5, 19, 20, 710/31, 52, 58, 38, 33; 712/225; 711/112, 114

(56) References Cited

U.S. PATENT DOCUMENTS

| | | | | | |
|---|---|---|---|---|---|
| 5,072,368 | A | * | 12/1991 | Foreman et al. ............ | 395/575 |
| 5,511,177 | A | * | 4/1996 | Kagimasa et al. ........... | 711/114 |
| 5,940,862 | A | * | 8/1999 | Erickson et al. ............. | 711/154 |
| 6,101,497 | A | * | 8/2000 | Ofek ............................ | 707/10 |
| 6,108,750 | A | * | 8/2000 | Yamamoto et al. .......... | 711/112 |
| 6,216,211 | B1 | * | 4/2001 | McBrearty et al. .......... | 711/162 |
| 6,477,591 | B1 | * | 11/2002 | VanderSpek .................. | 710/38 |
| 6,553,390 | B1 | * | 4/2003 | Gross et al. ................. | 707/202 |

* cited by examiner

Primary Examiner—Jeffrey Gaffin
Assistant Examiner—Rijue Mai

(57) ABSTRACT

A method and system for decreasing the time needed for a mirror split operation in a data storage device by preparing for the mirror split operation during a time interval between notification of an intended mirror split operation and the subsequent time of the mirror split operation. In general, local writes are processed preferentially and asynchronously with respect to corresponding mirror writes, but, after receiving a split advance warning, the data storage device controller preferentially processes backlogged mirror writes in order that the mirrored data storage units are nearly consistent at the time that the intended mirror split operation request is received.

4 Claims, 8 Drawing Sheets

METHOD AND SYSTEM FOR PROVIDING ADVANCED WARNING TO A DATA STAGE DEVICE IN ORDER TO DECREASE THE TIME FOR A MIRROR SPLIT OPERATION WITHOUT STARVING HOST I/O REQUEST PROCESSSING

TECHNICAL FIELD

The present invention relates to mirror split operations conducted by data-storage device controllers and, in particular, to a method and system for decreasing the time needed for execution of a mirror split operation by preparing for the mirror split operation, following notification of an impending mirror split operation, and prior to reception of a request for the corresponding mirror split operation.

BACKGROUND OF THE INVENTION

The present invention relates to mirror split operations conducted by the controllers of various types of data storage devices. The described embodiment relates to disk-array data-storage devices and disk-array controllers. Therefore, a concise background of disk and disk-array technologies is provided below.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ request carried out by the storage device, data is returned via communications medium 102 to a remote computer, and as a result of a write request, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105, which stores I/O requests received from remote computers, and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations, in which data is stored onto, or retrieved from, the disk platters 104, is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The data contained in WRITE requests may also be stored first in cache memory 207, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes to tens or hundreds of terabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write requests directed to various objects stored on a LUN. I/O WRITE requests directed to object "$O_3$" are represented by arrow 306. When object-level mirroring is enabled, the disk array controller providing LUNs A and B automatically generates a second I/O write request from each I/O write request 306 directed to LUN A, and directs the second generated I/O write request via path 307, switch "Si" 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write request, or any other type of I/O request that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_2$," and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write requests or other I/O operations that change the storage state of primary data object "$O_3$," are automatically reflected to the mirror object "$O_3$" 303.

In the described embodiment, mirroring is conducted by a disk array controller on a per LUN basis. In the described embodiment, a LUN may be mirrored on a remote LUN for various reasons, including for preparation of a backup copy of a LUN for database backup, checkpoint, or archival purposes. For these purposes, a LUN may be mirrored for some interval of time, and the mirroring may then be disabled, or, in other words, the mirror LUN may then be split, so that the remote LUN of the local-LUN/remote-LUN mirror pair can be used as a consistent snapshot of the data state of the local LUN at a later point in time. Thus, the mirroring capability built into disk array controllers can be exploited for efficient, hardware-level data backup by database management systems and other application programs.

Unfortunately, the mirror split operation may take a fairly long period of time to complete, during which time the remote LUN is not available for backup and archival purposes. In many cases, backup utilities and other application programs or system routines that employ hardware-based mirroring for generating backup copies require that neither the remote LUN nor the local LUN be actively responding to host-computer I/O requests during the mirror split operation. Thus, although an instantaneous mirror split would be most desirable from the standpoint of an application program, such as a database management system, in order to quickly produce backup copies without interrupting service to users, hardware-based backup copy generation by mirror split operations can result in extensive downtime for the application, in the case of large gigabyte-sized LUNs, often ranging from many tens of minutes to hours.

FIGS. 4A–D illustrate problems that prevent quick mirror split operations. In FIGS. 4A–D, a simplified, abstract view of mirror-related I/O request handling is provided. The view is simplified because only a single mirrored LUN pair is discussed, although a disk array controller needs to concurrently handle processing of I/O requests directed to tens to thousands of mirrored LUN pairs. Nonetheless, the problems illustrated in FIGS. 4A–D are representative, on a small scale, of the many concurrently overlapping problems experienced by a disk array controller.

FIGS. 4A–D employ similar illustrative conventions. These conventions are described with reference to FIG. 4A, and many of the numerical labels introduced in FIG. 4A will be used in all of FIGS. 4A–D, as well as in FIGS. 5A–D, discussed in a following section.

In FIG. 4A, I/O requests directed to a mirrored LUN pair are input to an input queue 402. These I/O requests are dequeued from the input queue 402 and processed by the disk array controller. In the current discussion, the I/O requests are assumed to be WRITE requests. The disk array controller dequeues WRITE requests from the input queue 402 and processes each WRITE request by writing data to a local LUN 404 and queuing the WRITE request to an output queue 406 from which the WRITE request will be transferred to the remote LUN of a remote disk array 408. Note that the output queue 406 represents, for current purposes, the entire process of transferring a mirror WRITE request to the remote LUN and executing the WRITE request there. As will be seen below, problems may arise from a backlog of pending mirror WRITE requests, but it is immaterial, in the context of the present discussion, which step in the overall process of transferring and executing mirror WRITE requests represents the throttle point, or rate-limiting step. The LUN mirroring can also occur within a single disk array, in which both LUNs of a mirrored LUN pair are local LUNs. However, it is convenient for descriptive purposes to discuss an embodiment in which one LUN of a mirrored pair resides in a local disk array and the other LUN of the mirrored LUN pair resides in a remote disk array, as shown in FIG. 4A. Note that FIG. 4A is an abstract representation of actual I/O request processing that occurs within a disk array controller. In many implementations, there are not separate input and output queues for each LUN, for example, and many different types of I/O requests are processed, in addition to WRITE requests. Again however, the complex problems arising in a disk array can be thought of as a combination of many problems similar to the problems illustrated in FIGS. 4A–D for a single mirrored LUN pair.

The simple scheme illustrated in FIG. 4A can be abstractly represented in a slightly different manner. In FIG. 4B, input queue 402 of FIG. 4A is divided into two input queues: (1) an input queue 410 that contains WRITE I/O requests directed to the local LUN; and (2) an input queue 412 containing mirror WRITE requests directed to the remote LUN of the local LUN/remote LUN mirrored pair. Thus, the two input queues represent the two separate WRITE operations conducted by a disk array controller for each host-computer WRITE request received by the disk array controller directed to a mirror pair. When the available WRITE request processing bandwidth within the local disk array is sufficient for processing WRITE requests directed to the local LUN as well as mirror WRITE requests directed to the remote LUN, then the sizes of the two input queues 410 and 412 and the output queue 406 tend to reach steady-state, equilibrium sizes, serving to briefly buffer small fluctuations in the rate of reception of WRITE requests and processing of the WRITE requests by the disk array controller.

Often, however, the available bandwidth within the disk array controller is insufficient to handle the combined WRITE-request processing requirements for locally executed WRITE requests and for mirror WRITE requests forwarded to the remote disk array. In this case, the sizes of at least one of the two input queues and output queue needs to grow in order to buffer WRITE requests received at a higher rate than they can be processed by the disk array controller. A first, common approach to processing WRITE requests in the face of insufficient available WRITE-request processing bandwidth is illustrated in FIG. 4C. In this approach, transfer of WRITE requests to the remote LUN is considered asynchronous with respect to execution of WRITE requests by the local LUN. In other words, when a host-computer WRITE request is received, the WRITE request is executed on the local LUN without regard to the eventual time of execution of the WRITE request on the remote LUN. In this case, the output queue 406 tends to increase in size, as illustrated in FIG. 4C. As the output queue 406 grows in size, more and more WRITE requests are buffered within the output queue, and the data state of the remote LUN falls further and further behind the data state of the local LUN. The disk array manages to execute WRITE requests received from host computers without perceptible delay, trading off quick response time to host computers for an increasingly large discrepancy between the data state of the local LUN and that of the remote LUN. When a split operation is directed to the disk array controller, the disk array controller needs to discontinue processing I/O requests received from external sources, and devote most of the available bandwidth to processing mirror WRITE requests, dequeued from the output queue 406, in order to bring the data state of the remote LUN to a state consistent with respect to the data state of the local LUN. Hence, for large LUNs, the split operation may take several hours in order to transfer WRITE requests backed-up on the output queue 406 to the remote LUN and execute those WRITE requests on the remote LUN.

An alternative approach to processing WRITE requests by the disk array controller, when insufficient WRITE-request processing bandwidth is available, is illustrated in FIG. 4D. In this approach, execution of a WRITE request on the local LUN is synchronous with execution of the corresponding mirror WRITE request on the remote LUN. In other words, the mirror WRITE request must be executed to completion on both the local LUN and remote LUN prior to processing of another host-computer WRITE request directed to the mirror pair. In this synchronous mirroring mode, as illustrated in FIG. 4D, the input queue 410 containing WRITE requests directed to the local LUN grows in size in order to buffer WRITE requests received from host computers that cannot be processed as quickly as they are received. In synchronous mirroring mode, a split operation can be accomplished almost instantaneously, because there are no backed-up WRITE requests languishing in the output queue, as is the case under asynchronous mirroring, illustrated in FIG. 4C. However, synchronous mode mirroring may result in serious interruption of host-I/O-request processing by the disk array controller. The WRITE requests buffered within input queue 410 in FIG. 4D may not be processed in a timely fashion, and host computer processes that issued the WRITE requests may be stalled or significantly slowed by increasing I/O request latency.

In general, asynchronous mirroring mode is preferred over synchronous mirroring mode, because, in general, timely processing of host-computer I/O requests is more important than mirror pair consistency. However, under asynchronous mirroring mode, mirror split operations are often quite slow, requiring tens of minutes to hours needed to flush an execute unprocessed WRITE requests directed to the remote LUN of a local LUN/remote LUN mirror pair. For this reason, designers, manufacturers, and users of data storage devices, including disk arrays, have recognized the need for a LUN mirroring method that does not significantly impact throughput of host I/O request processing but that supports relatively quick mirror split operations in order to provide hardware-level data storage backup capabilities.

SUMMARY OF THE INVENTION

In one embodiment of the present invention, a split advance warning feature is added to the controller of a disk array. This feature allows a host-computer application program, or host-computer system routine, to notify the disk-array controller of an impending mirror split operation related to a particular mirrored LUN pair provided by the disk array controller and, in the case that a LUN of the mirrored LUN pair is located in a remote disk array, by both the disk array controller and the disk array controller of a remote disk array. Upon receiving a split advance warning for a particular mirrored LUN pair, the disk-array controller can shift processing I/O requests for the mirrored LUN pair from a purely asynchronous mode, in which processing of WRITE requests directed to the local LUN are preferentially executed and asynchronously executed with respect to corresponding mirror WRITE requests directed to the remote LUN, to a hybrid WRITE-request processing mode that attempts to place the local LUN and mirror LUN in approximately data consistent states at the time that the impending mirror split operation is expected to occur. Thus, prior to a mirror split operation, processing of host-computer I/O requests on the local LUN may slow in order to process a backlog of mirror WRITE requests directed to the remote LUN.

DETAILED DESCRIPTION OF THE INVENTION

The present invention is related to mirror split operations that disable the automated mirroring of two LUNs by a data storage device controller. In the described embodiment, a mirror pair comprises a local LUN on a first data storage device mirrored to a remote LUN on a second data storage device. However, the present invention applies equally well to mirrored LUN pairs within a single data storage device. The described embodiment concerns disk arrays and disk array controllers, but the present invention may be applied to a wide variety of different types of data storage devices.

In asynchronous mirroring, the disk-array controller does not wait for execution of a mirror WRITE directed to the remote LUN before processing additional WRITE requests directed to the local LUN. In other words, in asynchronous mirroring, the data state of the remote LUN may considerably lag the data state of the local LUN, with many mirror WRITE requests buffered for eventual execution on the remote LUN. Asynchronous mirroring may provide for uninterrupted processing of host-computer I/O requests up to the maximum I/O request processing bandwidth available to the local LUN of a local LUN/remote LUN mirrored pair. However, a mirror split operation may require a significant lapse in the ability of the disk-array controller to process additional I/O WRITE requests directed to the local LUN, since the disk-array controller must first process buffered mirror WRITE requests in order to bring the remote LUN to a data state consistent with that of the local LUN. By contrast, synchronous mirroring ensures that the data states of the remote LUN and local LUN remain nearly consistent, but under synchronous mirroring, only a fraction of the I/O request processing bandwidth available for a LUN may be devoted to processing host-compute I/O requests on the local LUN, resulting in significant host-computer I/O request processing latency. The present invention is directed to providing mirror split operation execution speeds close to those obtained under synchronous mirroring while generally providing high throughput of host-computer I/O requests directed to the local LUN similar to those obtained under asynchronous mirroring.

Figure 1:
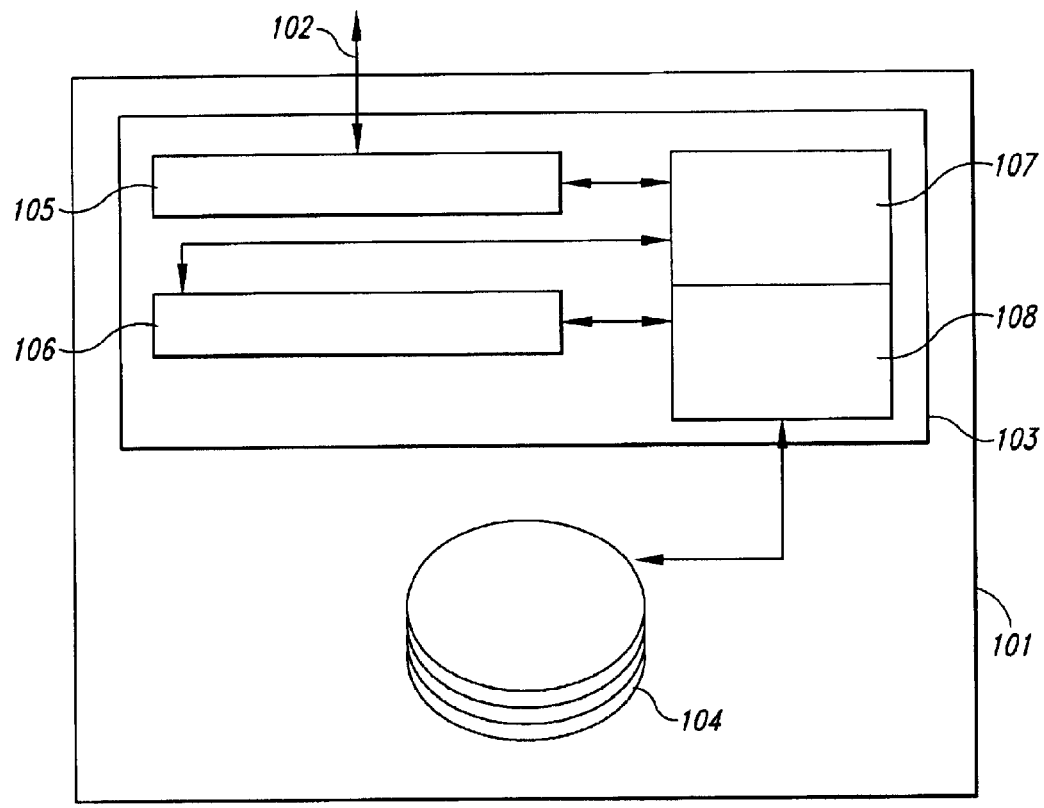
FIG. 1 is a block diagram of a standard disk drive.
Figure 2:
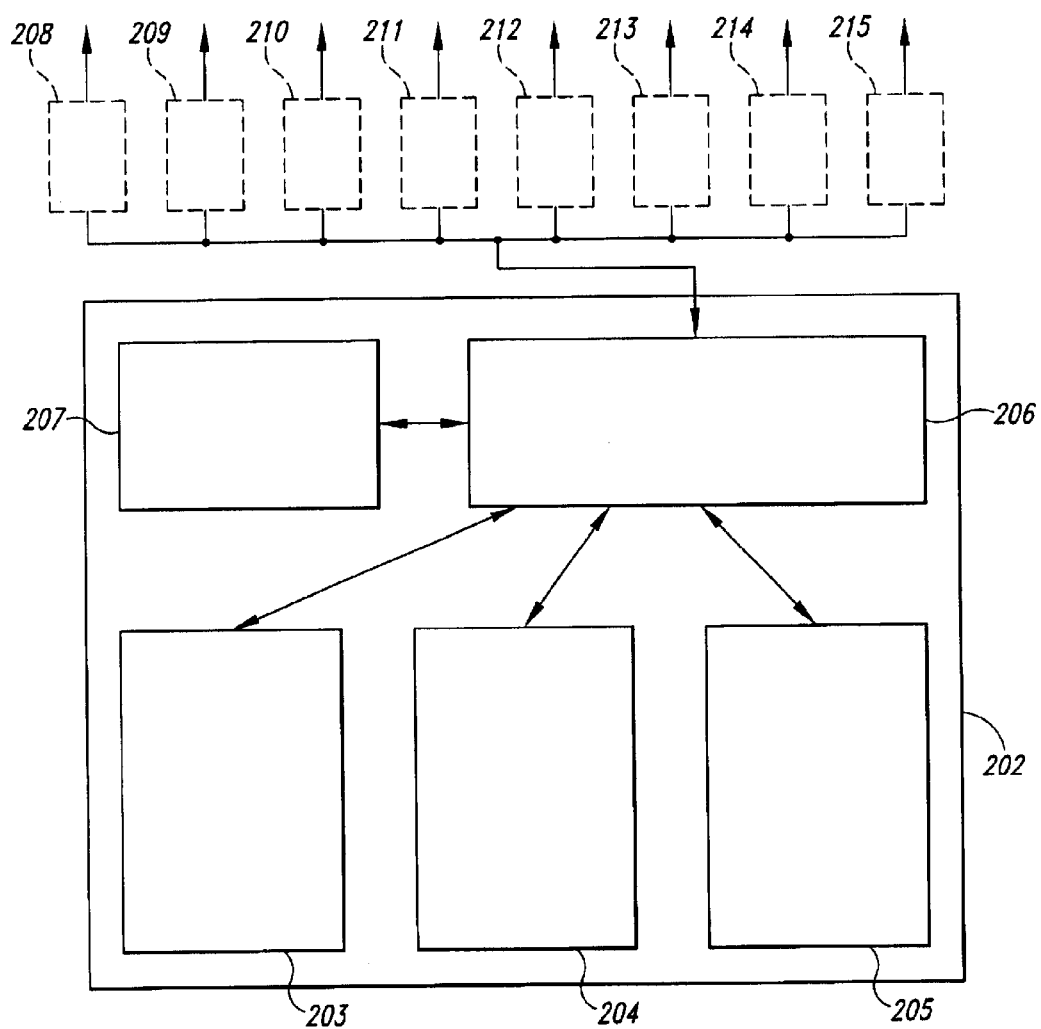
FIG. 2 is a simple block diagram of a disk array.
Figure 3:
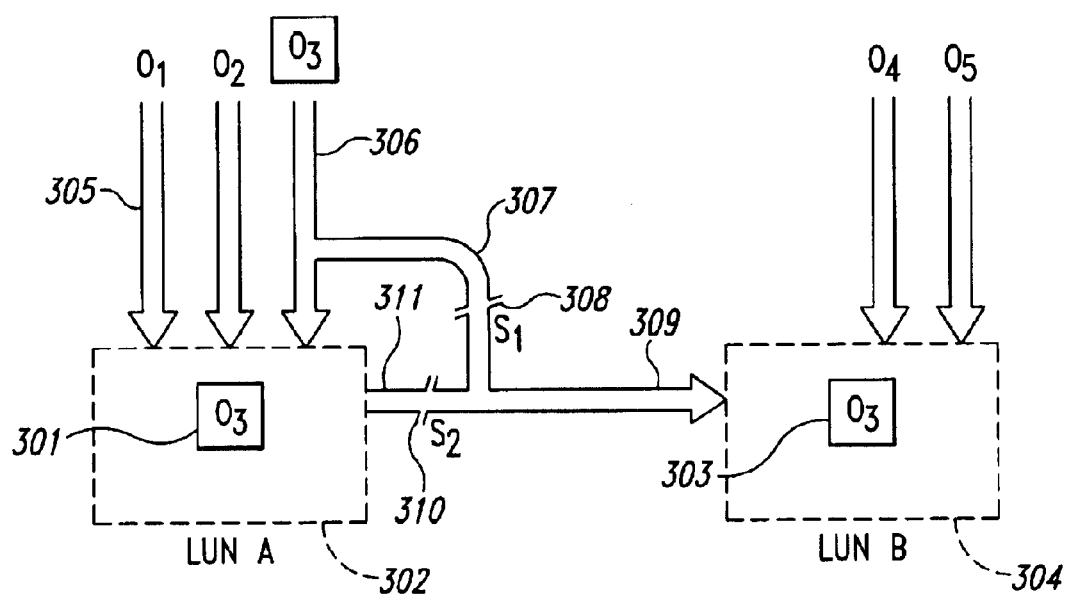
FIG. 3 illustrates object-level mirroring.
Figure 4A:
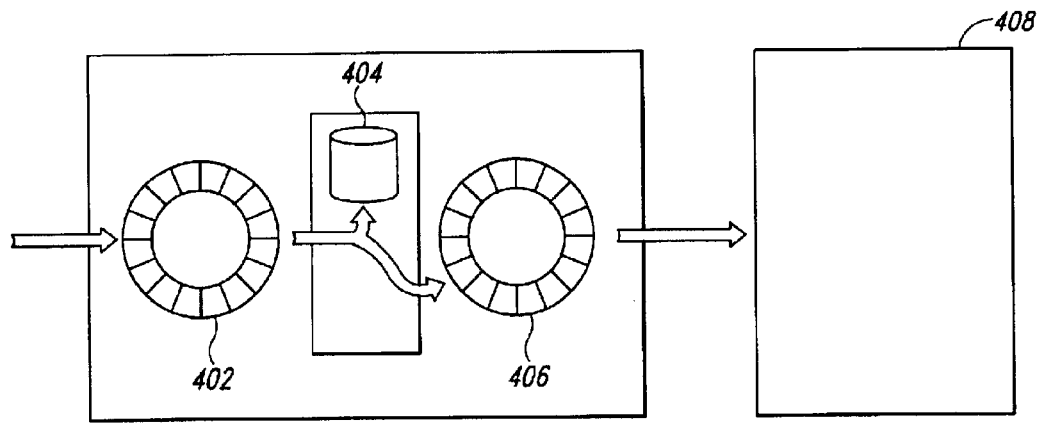
FIGS. 4A–D illustrate problems that prevent quick mirror split operations.
Figure 4B:
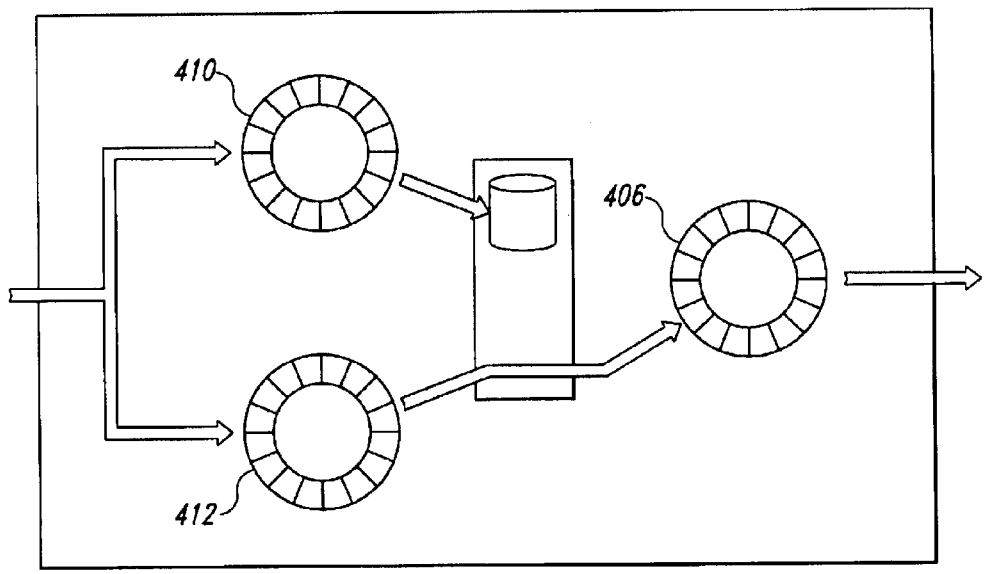
Figure 4C:
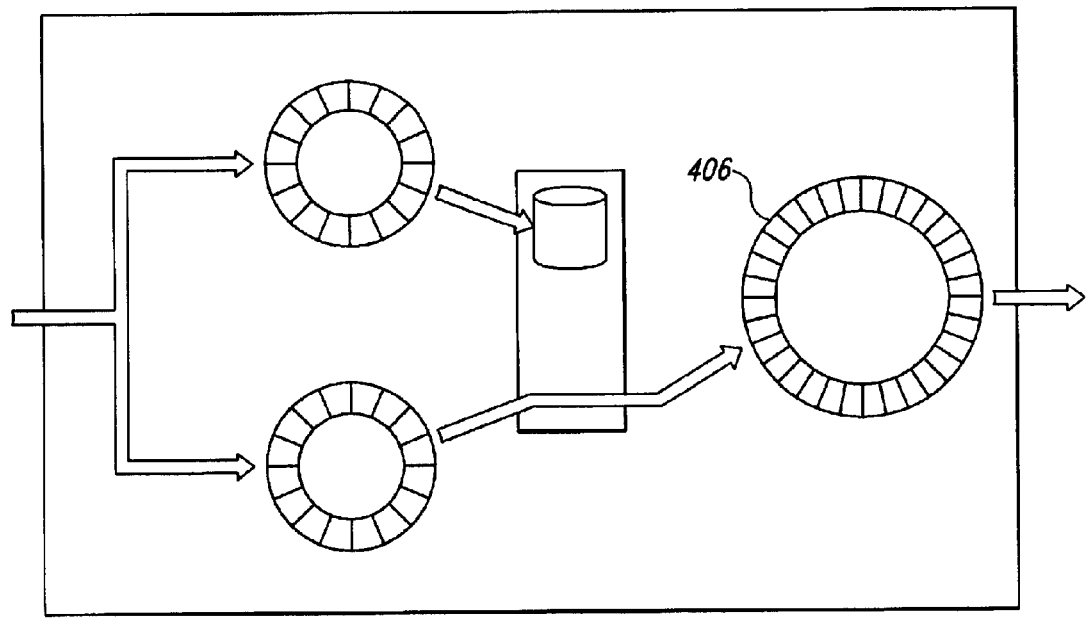
Figure 4D:
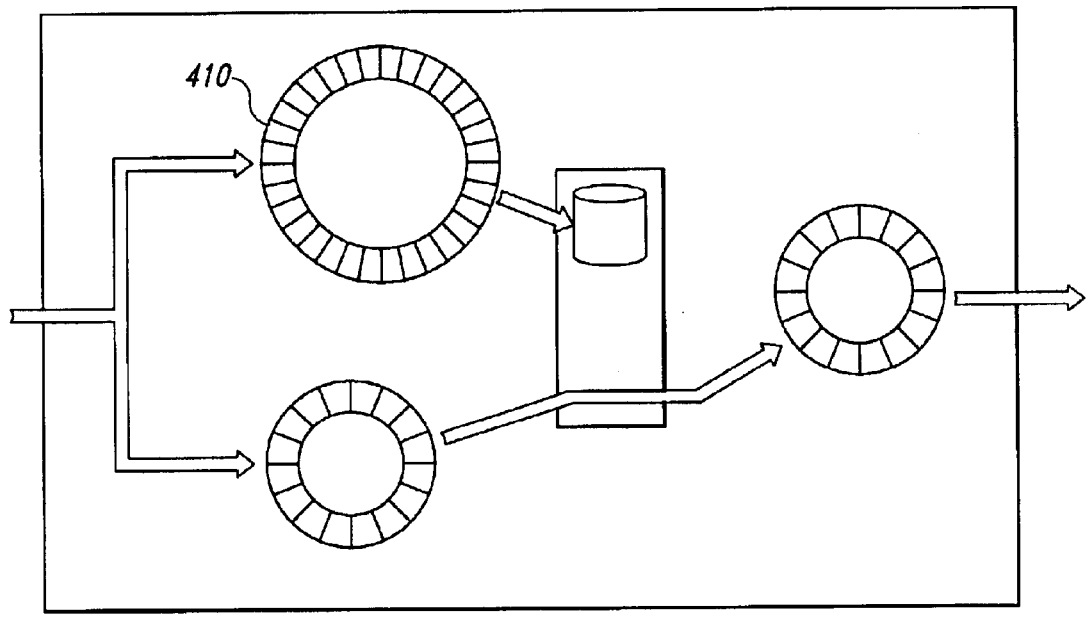
Figure 5A:
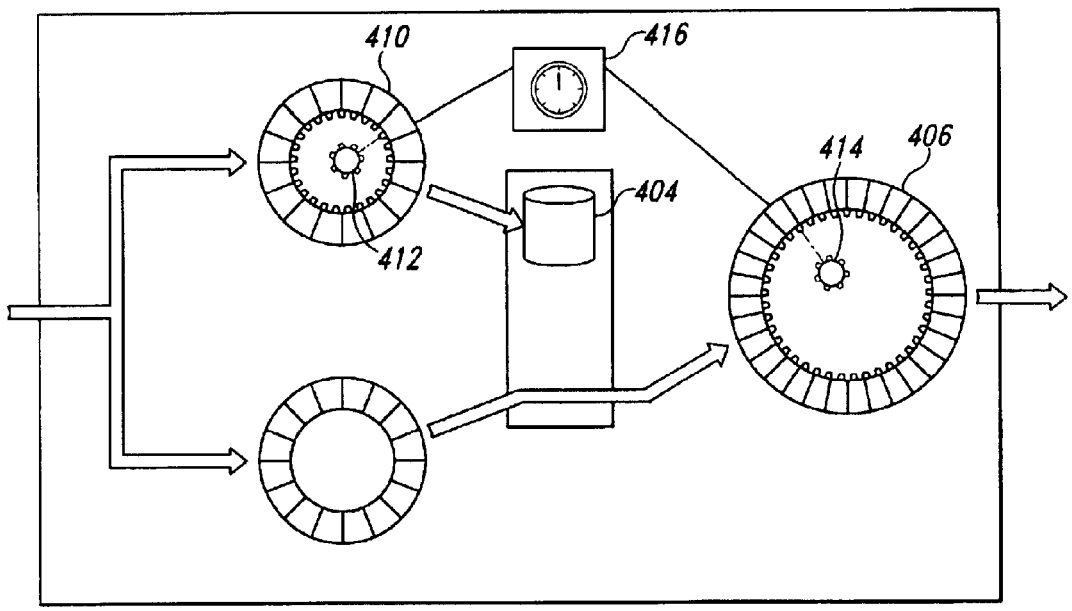
FIG. 5A shows processing of write requests for the local LUN of a local LUN/remote LUN mirrored pair prior to a mirror split operation and prior to warning of an impending mirror split operation.

The method of the present invention is abstractly illustrated in FIGS. 5A–D, which employ many of the illustrative conventions employed previously in FIGS. 4A–D, with common numerical labels for common features. FIG. 5A shows processing of write requests for the local LUN of a local LUN/remote LUN mirrored pair prior to a mirror split operation and prior to warning of an impending mirror split operation. As can be seen by comparing FIG. 5A to FIG. 4C, prior to warning of an impending mirror split operation, the disk-array controller processes WRITE requests under asynchronous mirroring mode. In other words, host-computer WRITE requests are dequeued from queue 410 and executed on the local LUN 404 in preference to dequeueing of mirror WRITE requests from the output queue 406 for transmission to, and execution on, the remote LUN. However, unlike in FIG. 4C, the disk-array controller employs additional features for WRITE request processing. These features are illustrated by way of a mechanical analogy in FIG. 5A. Dequeueing of WRITE requests from input queue 410 and output queue 406 is analogized to rotation of the ring-structured input queue 410 and output queue 406. Both input queue 410 and output queue 406 are illustrated as geared mechanical devices. New features include small, inner gears 412 and 414 within input queue 410 and output queue 406, respectively, and a timing and control component 416. Initially, prior to receiving warning of an impending mirror split operation, inner gears 412 and 414 are disengaged from input queue 410 and 406, shown in FIG. 5A. Thus, dequeueing and processing of WRITE requests from input queue 410 and output queue 406 are not explicitly rate-limited, but, as described above, when the rate of incoming WRITE requests exceeds the WRITE request processing bandwidth for the LUN, WRITE requests are dequeued and processed from input queue 410 in preference to dequeueing and processing WRITE requests from output queue 406.

Figure 5B:
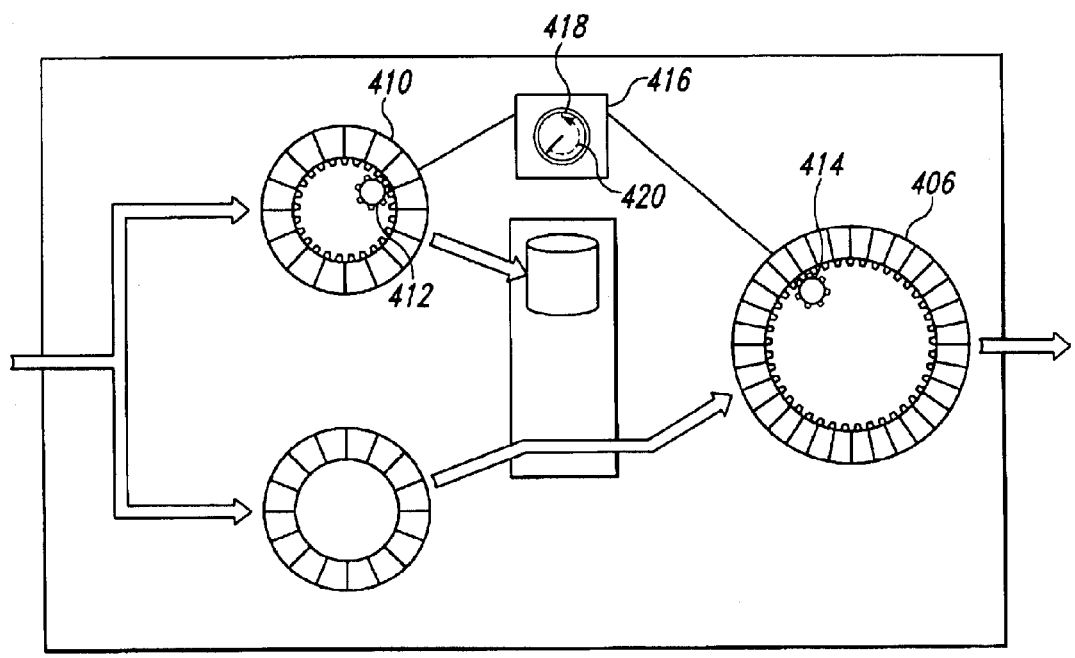
FIG. 5B illustrates the reception of a split advance warning.

FIG. 5B illustrates the reception of a split advance warning. In FIG. 5B, the disk-array controller has received a split advance warning from an application program or system routine warning the disk-array controller that a mirror split operation will be issued to the LUN after a specified interval of time. In response to receiving the split advance warning, the disk-array controller sets a timer 418 within the timer and control component 416 to the time remaining prior to issuance of the mirror split operation 420 and engages small gears 412 and 414 with input queue 410 and output queue 406, respectively. By figuratively engaging gears 412 and 414, the timer and control component 416 can coordinate rates of dequeueing and processing WRITE requests from the input queue 410 and output queue 406. The timer and control component 416 calculates a ratio of the rate of processing WRITE requests from output queue 406 to the rate of processing of WRITE requests from input queue 410 needed to remove any backlog of WRITE requests queued to the output queue prior to the expected time for the impending mirror split operation. The timer and control component 416 then coordinates the rates of WRITE request processing from input queue 410 and output queue 406 in order to correspond to the calculated ratio. The ratio is calculated so that, when the mirror split operation is issued to the disk-array controller at expiration of timer 418, the data state of the remote LUN will be nearly consistent with that of the local LUN, ensuring that the mirror split operation can proceed quickly.

Figure 5C:
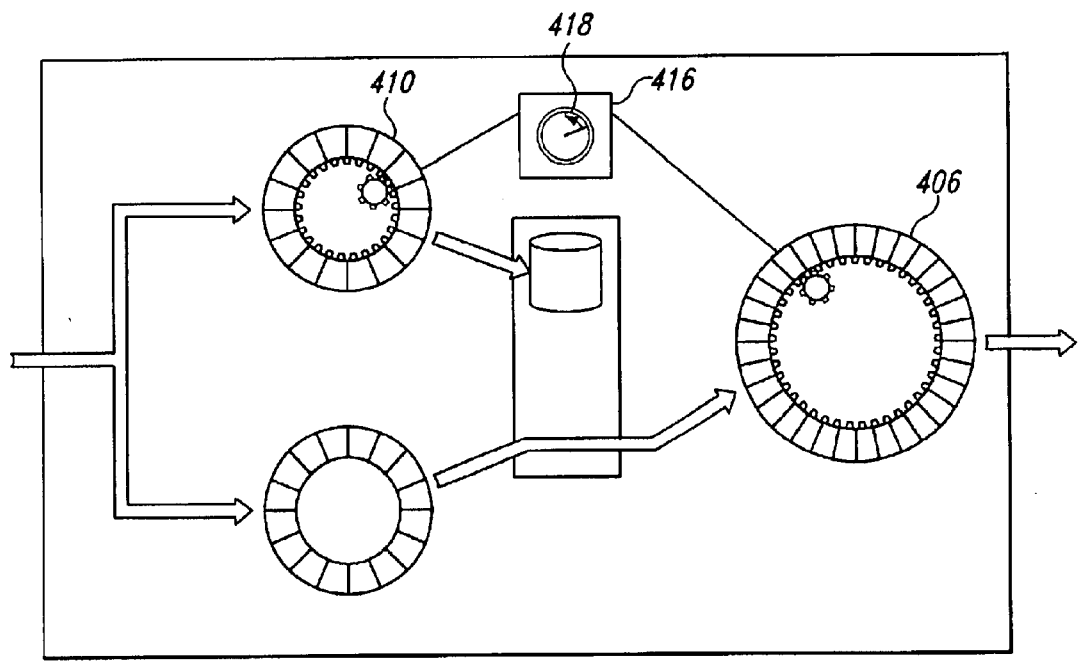
FIG. 5C illustrates WRITE-request processing by a disk-array controller for a local LUN during the interval of time between receiving a split advance warning and receiving the corresponding mirror split operation request.

FIG. 5C illustrates WRITE request processing by the disk-array controller for the local LUN during the interval of time between receiving a split advance warning and receiving the corresponding mirror split operation request. More than half the time interval has expired, as can be seen by comparing the timer 418 in FIG. 5C with the timer 418 in FIG. 5B. By controlling the respective rates of WRITE request processing from the input queue 410 and output queue 406, the disk-array controller has significantly decreased the number of mirror WRITE requests backed up on output queue 406 for transmission to, and execution on, the remote LUN, while significantly increasing the number of WRITE requests backed up on the input queue 410. In other words, the rate of WRITE request processing experienced by host computers has decreased significantly so that available bandwidth for processing WRITE requests can be devoted to decreasing the number of mirror WRITE requests backed up on the output queue 406.

Figure 5D:
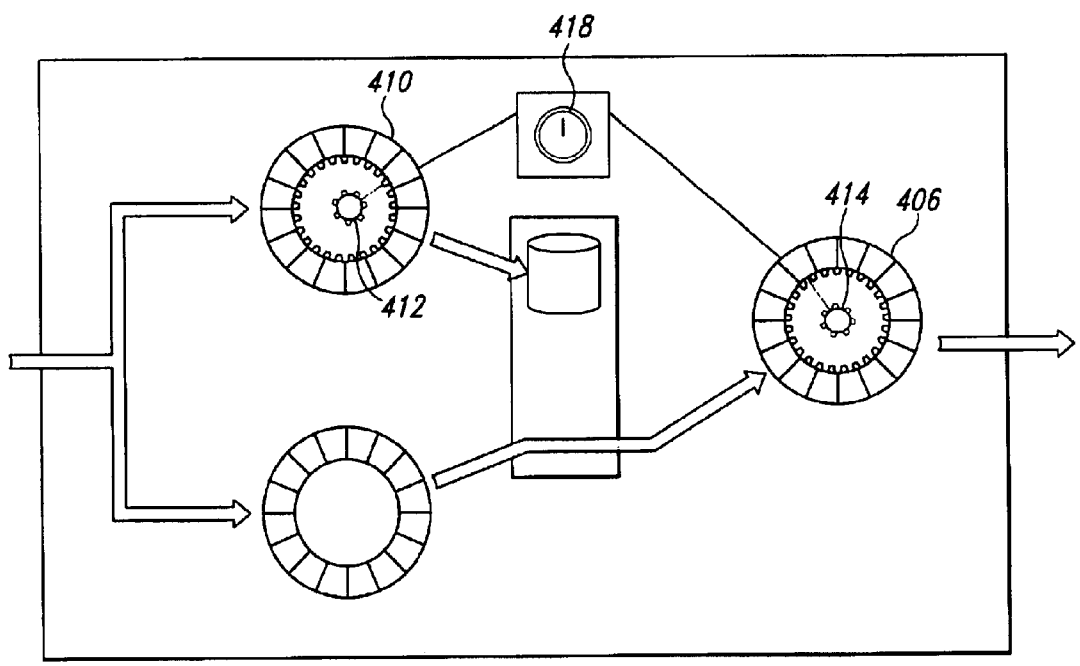
FIG. 5D illustrates WRITE request processing by a disk-array controller at a point in time that a mirror split operation, preceded by a split advance warning, is received.

Finally, FIG. 5D illustrates WRITE request processing of a disk-array controller at the point in time that a mirror split operation, preceded by a split advance warning, is received. As shown in FIG. 5D, the inner gears 412 and 414 are now disengaged from input queue 410 and output queue 406, respectively. The timer 418 has expired. The number of WRITE requests backed up on the input queue 410 has increased since the point in time illustrated in FIG. 5C, while the number of WRITE requests backed up on the output queue 406 has decreased to the number that would be expected when the rate of WRITE request reception by the disk-array controller for the LUN does not exceed the available WRITE request processing bandwidth that the disk-array controller can allocate for the LUN. At this instant in time, the mirror split operation can be carried out quite quickly, since the data state of the remote LUN is nearly consistent with that of the local LUN.

Figure 6:
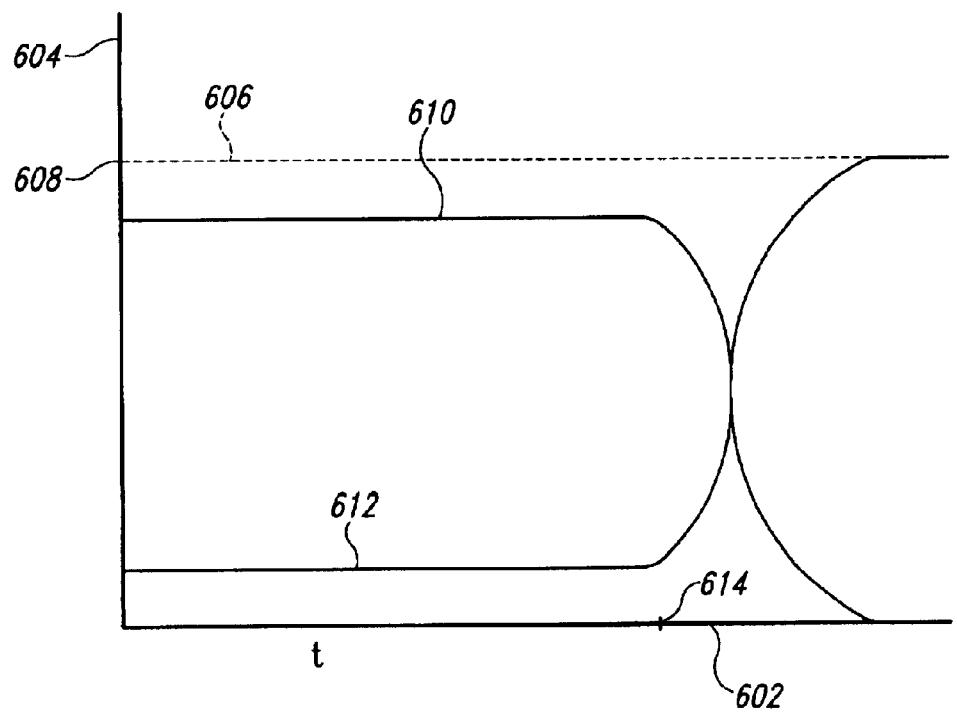
FIG. 6 illustrates the respective percentages of the total available WRITE processing bandwidth devoted to processing WRITE requests directed to a local LUN and processing mirror WRITE requests directed to a remote LUN of a local LUN/remote LUN mirrored pair just prior to, and just after receiving a mirror split operation request, when the rate of WRITE request reception exceeds the total WRITE request processing bandwidth of a data storage device.

FIG. 6 illustrates the respective percentages of the total available WRITE processing bandwidth devoted to processing WRITE requests directed to a local LUN and processing mirror WRITE requests directed to a remote LUN of a local LUN/remote LUN mirrored pair just prior to, and just after receiving a mirror split operation request, when the rate of WRITE request reception exceeds the total WRITE request processing bandwidth of a data storage device. In FIG. 6, time is plotted along the horizontal axis 602 and the rate of WRITE request processing is plotted on the vertical axis 604. The maximum rate of WRITE request processing, or the WRITE-processing bandwidth, is represented by horizontal dotted line 606 that intersects the vertical axis 604 at point 608, the maximum rate of WRITE request processing available to a LUN within a data storage device. In FIG. 6, the disk-array controller is processing WRITE requests at or near the maximum WRITE-request processing rate for the local LUN/remote LUN mirror pair under asynchronous mirroring mode. Thus, the majority of the WRITE processing bandwidth is devoted initially to processing WRITE requests directed to the local LUN, shown by curve 610, with a comparatively small fraction of the WRITE request processing bandwidth devoted to processing WRITE requests directed to a remote LUN, represented by curve 612. At a point in time 614 when a mirror split operation is received by the disk-array controller, the entire WRITE request processing bandwidth is suddenly devoted to processing WRITE requests directed to a remote LUN, shown in FIG. 6 by the steep rise of curve 612 to the maximum rate of WRITE processing represented by dotted line 606. At the same time, the percentage of the available WRITE request processing devoted to host-computer WRITE requests represented by curve 610 quickly falls to zero. As described above, this time-dependent WRITE request processing bandwidth apportionment may result in a very long mirror split operation, during which the data storage device is unavailable to additional host-computer WRITE request processing.

Figure 7:
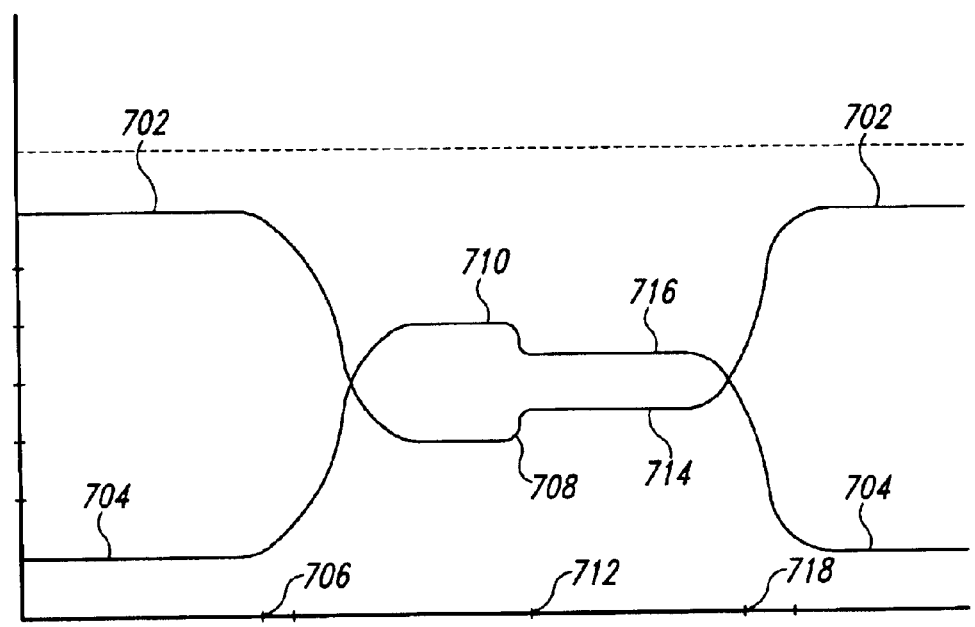
FIG. 7 illustrates, using the same illustrative conventions of FIG. 6, apportionment of the WRITE request processing bandwidth of a data storage device between processing WRITE requests directed to a local LUN and processing WRITE requests directed to the remote LUN by a data storage device controller, employing the techniques of the present invention, after receiving a split advance warning.

FIG. 7 illustrates, using the same illustrative conventions of FIG. 6, apportionment of the WRITE request processing bandwidth of a data storage device between processing WRITE requests directed to a local LUN and processing WRITE requests directed to the remote LUN by a disk-array controller, employing the techniques of the present invention, after receiving a split advance warning. Curve 702 represents the rate of WRITE-request processing of WRITE requests directed to the local LUN, and curve 704 represents the rate of WRITE request processing for WRITE requests directed to the remote LUN of a local LUN/remote LUN mirrored pair. At time 706, a split advance warning is received by the disk-array controller. The disk-array controller begins to control the rate of WRITE-request processing devoted to WRITE requests directed to the local LUN with respect to the rate of WRITE-request processing of WRITE requests directed to the remote LUN, increasing the latter and decreasing the former to new levels represented by horizontal curve sections 708 and 710, respectively. The disk-array controller readjusts the levels of WRITE request processing at a point in time 712 to obtain WRITE request processing levels 714 and 716. The rates of WRITE request processing are calculated by the disk-array controller so that, at time 718, when the mirror split operation request is received, the backlog of mirror WRITE requests has been decreased to the point that the data state of the remote LUN is nearly consistent with that of the local LUN. Thus, at time 718, the mirror split operation can be quickly carried out, and the initial, asynchronous mode mirroring can be quickly restored to prefer processing of WRITE requests directed to the local LUN 702 over WRITE requests directed to the remote LUN 704.

While the split advance warning technique of the present invention has been qualitatively illustrated in FIGS. 5–7, a simple C++-like pseudocode implementation of one embodiment of this technique is presented below, to further clarify this technique. This pseudocode implementation is by no means intended to represent even a small portion of the total functionality of the disk-array controller. Only a small portion of that functionality is described in the pseudocode. First, pseudocode representing a purely asynchronous mirroring mode is provided below, starting with four C++-like pseudocode class declarations:

```
1  class IORequest
2  {
3  };
1  class storage
2  {
3  public:
4        void executeRequest(IORequest* r);
5  };
1  class queue
2  {
3        public:
4              void inQueue(IORequest* r);
```

-continued

```
5            IORequest* outQueue( );
6            int numQueued( );
7            queue(void (*a)(queue* qu));
8  };
1  class LUNhandler
2  {
3       private:
4            queue* inputQueue;
5            queue* outputQueue;
6            storage* local;
7            storage* remoteMirror;
8       public:
9            void handle( );
10           void split( );
11           LUNhandler(queue* in, queue* out, storage* loc,
                 storage* remote);
12 };
```

The class "IORequest" represents an I/O request that can be received by the disk-array controller for execution on the local LUN and remote LUN of a local LUN/remote LUN mirror pair. No member data or member functions are shown for this class because, for the purposes of the following C++-like pseudocode routines, those details are unnecessary. Similarly, the class "storage" is declared to represent a generalized physical storage device interface to which I/O request instances can be forwarded for execution. The class "queue" represents a generalized queue, such as input queue 410 and output queue 406 of FIGS. 4 and 5. The class "queue" contains the following member functions: (1) member function "inQueue," declared above on line 4, which queues an I/O request pointed to by argument "r" to the queue; (2) the member function "outQueue," declared above on line 5, that dequeues an I/O request from the queue and returns a pointer to the queued I/O request; (3) the member function "numQueued," declared on line 6, that returns an integer representing the number of I/O requests currently queued to the queue; and (4) the member function "queue," a constructor for the class "queue," which receives a pointer to a callback function, as argument, to initialize the queue. The callback function is called whenever a WRITE request is queued to the queue.

The class "LUNhandler" represents the disk-array controller process that handles I/O requests input from host computers. The class "LUNhandler" thus represents a pseudocode implementation of the functionality illustrated in FIGS. 4B–D. The class "LUNhandler" includes data members: (1) "inputQueue," an input queue corresponding to input queue 410 in FIGS. 4B–D; (2) "outputQueue," a queue corresponding to output queue 406 in FIGS. 4B–D; (3) the storage interface "local" which represents the interface to the local LUN of a local LUN/remote LUN mirror pair; and (4) the storage interface "remoteMirror" that represents the interface to the remote LUN of a local LUN/remote LUN mirror pair. The fact that the remote LUN storage interface will differ significantly from the local LUN storage interface is not relevant to discussion of the techniques of the present invention, and is therefore not addressed in the pseudocode. Note also that it is assumed that queues "inputQueue" and "outputQueue" are suitably initialized to call the member function "handle," to be described below, upon queuing of a WRITE request to the queue, but that only a single instance of member function "handle" is executed at any given time, so that WRITE requests queued to the queues while the member function "handle" is active do not result in spawning of additional processes or threads for separate execution of member function "handle." Again, these details are outside the scope of the present discussion, and are therefore not reflected in the C++-like pseudocode implementation. The class "LUN-handler" includes three member functions: (1) "handle," a generalized I/O request handler specific to a particular LUN; (2) "split," a member function representing processing of a mirror split operation, an implementation for which is not provided, because the mirror split operation is outside the scope of the current discussion; and (3) a constructor for the data storage device mirror LUN handling process.

An implementation of the mirror LUN handling process "handle" is provided below:

```
1  void LUNhandler::handle( )
2  {
3       IORequest* nxt;
4
5       while (inputQueue->numQueued( ) +
               outputQueue->numQueued( ) > 0)
6       {
7            nxt = inputQueue->outQueue( );
8            while (nxt != NULL)
9            {
10               local->executeRequest(nxt);
11               outputQueue->inQueue(nxt);
12               nxt = inputQueue->outQueue( );
13           }
14           if((nxt = outputQueue->outQueue( )) != NULL)
15           {
16               remoteMirror->executeRequest(nxt);
17           }
18      }
19 }
```

The member function "handle" includes a local variable "nxt," declared on line 3, that references a dequeued I/O request. The member function "handle" continuously processes WRITE requests in the while-loop of lines 5–18 until no WRITE requests remain to be handled. First, the member function "handle" attempts to dequeue a next WRITE request from the input queue on line 7. Then, if a WRITE request is successfully dequeued, the while-loop of lines 8–13 commences execution. The dequeued WRITE request is issued to the local LUN on line 10, and a mirror WRITE corresponding to the WRITE request is queued to the outqueue on line 11. Then, another WRITE request is attempted to be dequeued from the input queue on line 12. The while-loop of lines 8–13 continues to execute while any WRITE requests are queued to the input queue. If no further WRITE requests are queued to the input queue, then the member function "handle" attempts to dequeue a single WRITE request from the output queue on line 14. If a WRITE request is successfully dequeued from the output queue, then member function "handle" delivers the dequeued WRITE request to the remote LUN interface on line 16. Thus, member function "handle," during each iteration of the while-loop of lines 5–18, handles as many WRITE requests from the input queue as possible, and then handles a WRITE request dequeued from the output queue. If member function "handle" can handle WRITE requests faster than they are queued to the input queue, there will be no backlogged WRITE requests queued to the output queue; otherwise, the output queue will buffer backlogged mirror WRITE requests, leading to the data state of the remote LUN substantially lagging the data state of the local LUN.

In order to incorporate the present invention into the model LUN-handling pseudocode implementation, presented above, nine additional data members and an additional member function need to be added to the class "LUNhandler." An enhanced class "LUNhandler" is provided below:

```
 1  class LUNhandler
 2  {
 3          private:
 4                  queue* inputQueue;
 5                  queue* outputQueue;
 6                  storage* local;
 7                  storage* remoteMirror;
 8                  bool SAW;
 9                  int initSplitWarning;
10                  int splitTime;
11                  int evalTime;
12                  int maxIORequestsPerSec;
13                  int evalPeriod;
14                  int numLocal;
15                  int numRemote;
16                  float SAWratio;
17         public:
18                  void handle( );
19                  void split( );
20                  void splitWarning(int timeToSplit,
                         int MaxIORequestsPerSec);
21                  LUNhandler(queue* in, queue* out, storage* loc,
                         storage* remote);
22  };
```

The enhanced class "LUNhandler" includes the following new data members: (1) data member "SAW," declared on line 8, a Boolean indication of whether or not a split advance warning is currently being handled; (2) data member "initSplitWarning," declared on line 9, an integer that stores the system time that the currently handled split advance warning was received; (3) data member "splitTime," declared on line 10, an integer that stores the time that a mirror split operation request is expected; (4) data member "evalTime," declared on line 11, the next time that the WRITE processing ratio "SAWratio," discussed below, needs to be reevaluated; (5) data member "maxIORequestsPerSec," declared on line 12, a maximum bandwidth in I/O requests/sec; (6) data member "evalPeriod," declared on line 13, the time interval between reevaluations of the WRITE processing ratio "SAWratio"; (7) data member "numLocal," declared on line 14, one more than the number of WRITE requests processed for execution on the local LUN since reception of a split advance warning; (8) data member "numRemote," declared on line 15, one more than the number of WRITE requests processed for execution on the remote LUN since reception of a split advance warning; and (9) data member "SAWratio," declared above on line 16, the calculated WRITE-request processing rate ratio equal to the WRITE-request rate for processing remote LUN WRITEs divided by the WRITE-request rate for processing local LUN WRITEs in order to achieve local and remote LUN data-storing consistency at the point in time that an impending mirror split operation is expected to be received.

The enhanced LUNhandler class declaration includes a new member function "splitWarning," declared above on line 20, that represents processing of a split advance warning received by the disk-array controller. The member function "splitWarning," provided below, includes instructions for initializing member data to control the rates of processing of WRITE requests received from host computers directed to the local LUN and mirror WRITE requests directed to the remote LUN in order to ensure that, by the time the mirror split operation corresponding to the split advance warning is received, the data states of the remote LUN and the local LUN are nearly consistent. An implementation of the routine "splitWarning" is provided, below:

```
 1  void LUNhandler::splitWarning(int timeToSplit,
        int MaxIORequestsPerSec)
 2  {
 3          int numIOs = outputQueue->numQueued( );
 4          int secs;
 5          if (SAW) return;
 6          maxIORequestsPerSec = MaxIORequestsPerSec;
 7          initSplitWarning = GET_TIME( );
 8          splitTime = initSplitWarning + timeToSplit;
 9          evalPeriod = timeToSplit / numEvals;
10          if (evalPeriod < minEvalPeriod) evalPeriod =
                 minEvalPeriod;
11          evalTime = initSplitWarning + evalPeriod;
12          secs = numIOs/maxIORequestsPerSec;
13          if (secs > timeToSplit) SAWratio = 1.0;
14          else SAWratio = secs / timeToSplit;
15          numLocal = 1
16          numRemote = 1;
17  }
```

The argument "timeToSplit" provides a time, in seconds, to the expected issuance of the mirror split operation corresponding to the split advance warning. The argument "MaxIORequestsPerSec" is the maximum rate, in WRITE requests per second, that the disk-array controller can allocate to the mirror LUN. Presumably, this maximum rate value is a known constant or a calculatable value furnished by the disk-array controller as part of translating a split advance warning received from a communications device into the call to member function "splitwarning." The local variable "numIOs," declared and initialized on line 3, is set to the number of WRITE requests queued to the output queue at the time that the split advance warning is received. The local variable "secs," declared on line 4, is used in various subsequent expressions. On line 5, splitWarning determines whether or not the disk-array controller is currently processing a split advance warning for the LUN. If so, then splitWarning returns. In alternate embodiments, a failure code might be returned at this point so that the host process that issued the split advance warning can be notified of its failure. On line 6, the data member "maxIORequestsPerSec" is set to the value of argument "MaxIORequestsPerSec." On line 7, the data member "initSplitWarning" is set to the current system time. On line 8, the data member "splitTime" is set to the time at which the mirror split operation is expected to be issued. On lines 9–10, the data member "evalPeriod" is set to the time interval, in seconds, after which the ratio controlling respective rates of local WRITE processing and mirror WRITE processing is controlled. In general, the evaluation period will be the total time remaining to issuance of a mirror split operation divided by a desirable number of reevaluations, as calculated on line 9. However, if the evaluation period is too short, the data member "evalperiod" is set to some minimum acceptable evaluation period. On line 11, splitWarnings sets the data member "evalTime" to the time at which the current evaluation period interval expires. On lines 12–14, the data member "SAWratio" is set to the ratio of the rate of processing of mirror WRITE requests to local WRITE requests needed to achieve data consistency at the time of the mirror split operation or, if insufficient time is left, to "1.0." Finally, on lines 15–16, the data members "numLocal" and "numRemote" are both set to "1."

Finally, an implementation of an enhanced member function "handle" embodies techniques of the present invention is provided, below:

```
1  void LUNhandler::handle( )
2  {
3        IORequest* nxt;
4        int time = GET_TIME( );
5        int secs;
6        int timeRemaining;
7        if (SAW)
8        {
9              if (time >= splitTime)
10             {
11                   SAW = false;
12                   SAWratio = 0.2;
13             }
14             else if (time >= evalTime)
15             {
16                   evalTime += evalPeriod;
17                   secs = outputQueue->numQueued( )/
                           maxIORequestsPerSec;
18                   timeRemaining = splitTime - time;
19                   if (secs > timeRemaining) SAWratio = 1.0;
20                   else SAWratio = secs / timeRemaining;
21             }
22             while (inputQueue->
                     numQueued( ) + outputQueue->numQueued( )) > 0)
23             {
24                   while ((numRemote/numLocal < SAWratio)
25                          || (inputQueue->
                                numQueued( ) == 0))
26                   {
27                         nxt = outputQueue->outQueue( );
28                         remoteMirror->executeRequest(nxt);
29                         numRemote++;
30                   }
31                   if ((nxt = inputQueue->outQueue( )) !=
                        NULL)
32                   {
33                               local->
                                 executeRequest(nxt);
34                               numLocal++;
35                               outputQueue->
                                 inQueue(nxt);
36                   }
37             }
38       }
39       else
40       {
41             while(inputQueue->numQueued( ) +
                    outputQueue->numQueued( )) > 0)
42             {
43                   nxt = inputQueue->outQueue( );
44                   while (nxt != NULL)
45                   {
46                         local->
                             executeRequest(nxt);
47                         outputQueue->
                             inQueue(nxt);
48                         nxt = inputQueue->
                             outQueue( );
49                   }
50                   if ((nxt = outputQueue->outQueue( )) !=
                        NULL)
51                   {
52                               remoteMirror->
                                 executeRequest(nxt);
53                   }
54             }
55       }
56  }
```

The enhanced member function "handle" incorporates the previous version of member function "handle" in lines 40–54 for the case that no split advance warning has been received. Thus, when not warned of an impending mirror split operation, host-computer WRITE requests directed to the local LUN are preferentially processed with respect to mirror WRITE requests, under a strictly asynchronous mode of operation, as described previously. This latter portion of the enhanced member function "handle" will not be again described, for the sake of brevity.

Four local variables are declared on lines 3–6: (1) "nxt," a reference to an I/O request dequeued from the input queue; (2) "time," the current system time; (3) "secs," a temporary variable used in ratio calculations; and (4) "timeRemaining," a local variable that holds the amount of time remaining until the expected mirror split operation. On line 7, the enhanced member function "handle" determines whether or not a split advance warning is currently active. If so, then the code on lines 9–36, to be described below, is executed. Otherwise, the new version of "handle" is identical to the old version, encapsulated in lines 40–53.

On line 9, member function "handle" determines whether or not the current time is equal to, or later than, the expected time of the mirror split operation. If so, then data member "SAW" is set to FALSE on line 11, and the ratio "SAWratio" is set to 0.2, on line 12. When SAW is set to FALSE, and following completion of the current invocation of member function "handle," member function "handle" will resume processing WRITE requests in asynchronous mirroring mode in a subsequent invocation, and, in the present invocation, processes WRITE requests in nearly asynchronous mirroring mode. If the expected time of the mirror split operation has not yet been reached, then member function "handle" determines whether the current evaluation period has expired, on line 14. If so, then member function "handle" calculates a time of expiration of the next, subsequent evaluation period on line 16, and recalculates the WRITE request processing ratio "SAWratio" on lines 17–20. This recalculation represents fine-tuning and dynamic self-adjustment, so that the ratio of mirror WRITE processing to host WRITE processing remains tuned to achieving local LUN/remote LUN data consistency at the end of the split advance warning interval. Next, in the while-loop of lines 22–36, member function "handle" processes queued WRITE requests while WRITE requests remain queued to either or both of the input and output queues. In the while-loop of lines 24–29, member function "handle" processes mirror WRITE requests from the output queue as long as the number of mirror WRITE requests processed since the split advance warning divided by the number of host WRITE requests processed since the split advance warning is less than the computed ratio "SAWratio," or when there are no additional local WRITE requests to process. Member function "handle" alternates processing mirror WRITE requests with processing a single local WRITE request, on lines 30–35, during each iteration of the while-loop of lines 22–36. Thus, during the time between a split advance warning and issuance of the mirror split operation, mirror WRITE requests are processed in preference to local WRITE requests, in order that the remote LUN and local LUN data states converge to near consistency at the expected time of issuance of the mirror split operation request.

Although the present invention has been described in terms of a particular embodiment, it is not intended that the invention be limited to this embodiment. Modifications within the spirit of the invention will be apparent to those skilled in the art. For example, split advance warning techniques can be incorporated into any number of different types of data storage devices, including disk arrays, but in no way limited to disk arrays. As with any procedural technique, there are an almost limitless number of ways of implementing split advance warning, both in software as well as in firmware and hardware. In the above example, the WRITE processing ratio used to control the rate of local WRITE processing versus mirror WRITE processing is based on a maximum number of WRITE requests that can be processed each second by the disk-array controller on behalf of a mirror LUN. However, in more sophisticated systems, it may well be possible to calculate the actual time required for the different queued WRITE requests, and incorporate such calculations in determining the appropriate ratio of WRITE processing rates in order to achieve mirror data consistency between the LUNs of a mirror pair in the time between a split advance warning and issuance of a corresponding mirror split operation request. The technique employed in order to achieve data consistency may vary from a ratio-based technique, as described above, to other empirical or calculated methods that result in favoring mirror WRITE requests over host WRITE requests during the interval between the split advance warning and issuance of a mirror split operation. In the above-discussed example, the mirror LUN consists of a local LUN and a remote LUN but, as already discussed, the split advance warning technique is equally applicable to mirror LUNs within the same data storage device. Moreover, the split advance warning may be employed for mirroring techniques that involve more than two LUNs, such as a mirror triple, and that may be applied at a granularity different than a LUN granularity. For example, split advance warning might be employed in the aggregate for all pending host WRITE operations and pending mirror WRITE operations. As another example, processing of host-computer WRITE requests may slowed for all LUNs provided by a disk array in order to bring a particular mirror pair into a consistent state. As discussed above, the pseudocode implementation focused on processing WRITE requests, but other type of I/O requests that can change the state of a data storage device need also be included in the split advance warning technique.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for improving the performance of a mirror split operation by a data storage device controller, the method comprising:

providing a split advance warning interface for receiving a split advance warning;

upon receiving a split advance warning, determining a mirror-I/O-request-processing-to-local-I/O-request-processing-rate ratio in order to process backlogged mirror I/O requests prior to receiving a corresponding mirror split operation request; and processing mirror I/O requests and local I/O requests according to the mirror-I/O-request-processing-to-local-I/O-request-processing-rate ratio until an expected time of occurrence of the corresponding mirror split operation, periodically re-determining the mirror-I/O-request-processing-to-local-I/O-request-processing-rate ratio according to currently backlogged mirror I/O requests.

2. A method for improving the performance of a mirror split operation by a data storage device controller, the method comprising:

providing a split advance warning interface for receiving a split advance warning;

upon receiving a split advance warning, determining a mirror-I/O-request-processing-to-local-I/O-request-processing-rate ratio in order to process backlogged mirror I/O requests prior to receiving a corresponding mirror split operation request; and processing mirror I/O requests and local I/O requests according to the mirror-I/O-request-processing-to-local-I/O-request-processing-rate ratio until an expected time of occurrence of the corresponding mirror split operation, further including when mirror I/O requests are backlogged, and local I/O requests are pending, processing mirror I/O requests and local I/O requests at rates corresponding to the mirror-I/O-request-processing-to-local-I/O-request-processing-rate ratio, when mirror I/O requests are backlogged, and no local I/O requests are pending, processing mirror I/O requests, and when no mirror I/O requests are backlogged, and local I/O requests are pending, processing local I/O requests.

3. A data storage device controller that provides a split advance warning interface, the data storage device controller comprising:

a mirroring component that executes local I/O requests directed to a mirrored logical unit by executing the local I/O requests to a first logical unit and automatically generating a mirror I/O request directed to a second logical unit;

a buffering component for buffering incoming local I/O requests and for buffering mirror I/O requests; and a split advance warning component that determines a mirror-I/O-request-processing-to-local-I/O-request-processing-rate ratio according to which the data storage device controller processes buffered mirror I/O requests in preference to processing buffered incoming local I/O requests, that receives a split advance warning directed to mirrored logical unit, and that, after receiving the split advance warning, re-determines the mirror-I/O-request-processing-to-local-I/O-request-processing-rate ratio and controls the data storage device controller to preferentially process buffered mirror I/O requests over processing buffered incoming local I/O requests in order to bring the second logical unit into a data state consistent with a current data state of the first logical unit upon reception by the data storage device controller of a corresponding mirror split operation request.

4. A data storage device controller that provides a split advance warning interface, the data storage device controller comprising:

a mirroring component that executes local I/O requests directed to a mirrored logical unit by executing the local I/O requests to a first logical unit and automatically generating a mirror I/O request directed to a second logical unit;

a buffering component for buffering incoming local I/O requests and for buffering mirror I/O requests; and a split advance warning component that determines a mirror-I/O-request-processing-to-local-I/O-request-processing-rate ratio according to which the data storage device controller processes buffered mirror I/O requests in preference to processing buffered incoming local I/O requests, that receives a split advance warning directed to a mirrored logical unit, and that, after receiving the split advance warning, controls the data storage device controller to preferentially process buffered mirror I/O requests over processing buffered incoming local I/O requests in order to bring the second logical unit into a data state consistent with a current data state of the first logical unit upon reception by the data storage device controller of a corresponding mirror split operation request by when mirror I/O requests are backlogged, and local I/O requests are pending, processing mirror I/O requests and local I/O requests at rates corresponding to the mirror-I/O-request-processing-to-local-I/O-request-processing-rate ratio, when mirror I/O requests are backlogged, and no local I/O requests are pending, processing mirror I/O requests, and when no mirror I/O requests are backlogged, and local I/O requests are pending, processing local I/O requests.

* * * * *